United States Patent
Hara et al.

(10) Patent No.: US 7,812,636 B2
(45) Date of Patent: Oct. 12, 2010

(54) METHOD AND DEVICE FOR GENERATING PSEUDO-RANDOM BINARY DATA

(75) Inventors: Atsuo Hara, Fukuoka (JP); Akihide Otonari, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/577,998

(22) Filed: Oct. 13, 2009

(65) Prior Publication Data
US 2010/0033209 A1 Feb. 11, 2010

Related U.S. Application Data

(63) Continuation of application No. PCT/JP2007/000542, filed on May 21, 2007.

(51) Int. Cl.
*G06F 7/38* (2006.01)
*H03K 19/173* (2006.01)
(52) U.S. Cl. .............................. 326/46; 326/52; 326/53; 326/93
(58) Field of Classification Search ........................ None
See application file for complete search history.

(56) References Cited

U.S. PATENT DOCUMENTS

| 4,959,832 | A | * | 9/1990 | Bardell, Jr. ................. 714/739 |
| 6,188,714 | B1 | | 2/2001 | Yamaguchi |
| 7,236,594 | B2 | * | 6/2007 | Van Veldhoven et al. ...... 380/46 |
| 2009/0271463 | A1 | * | 10/2009 | Nariyoshi et al. ........... 708/252 |

FOREIGN PATENT DOCUMENTS

| JP | 3-104311 | 5/1991 |
| JP | 8-181577 | 7/1996 |
| JP | 9-6596 | 1/1997 |
| JP | 9-321585 | 12/1997 |
| JP | 2000-200177 | 7/2000 |
| JP | 2002-342072 | 11/2002 |

OTHER PUBLICATIONS

International Preliminary Report on Patentability and Written Opinion of the International Searching Authority dated Jan. 12, 2010, from the corresponding International Application.
International Search Report dated Jul. 31, 2007, from the corresponding International Application.

* cited by examiner

*Primary Examiner*—Anh Q Tran
(74) *Attorney, Agent, or Firm*—Katten Muchin Rosenman LLP

(57) ABSTRACT

A device for generating k-bit parallel pseudo-random data includes "n" registers, from the first through the n-th registers ("n" is an integer not less than 3), and "k" exclusive-OR gates, from the first through the k-th exclusive-OR gates ("k" is an integer not less than 2). An output of the m-th register is input to the (m+k)th register ("m" is an integer between 1 and (n−k)). Outputs of the first through the (k−1)th exclusive-OR gates are respectively input to the second through the k-th exclusive-OR gates. An output of the first register is input to the first exclusive-OR gate. The outputs of the first through the k-th exclusive-OR gates are respectively input to the k-th through the first registers. Outputs of "k" registers, from the (n−k+1)th through the n-th registers are respectively input to the k-th through the first exclusive-OR gates, and also extracted as the k-bit parallel pseudo-random data.

3 Claims, 15 Drawing Sheets

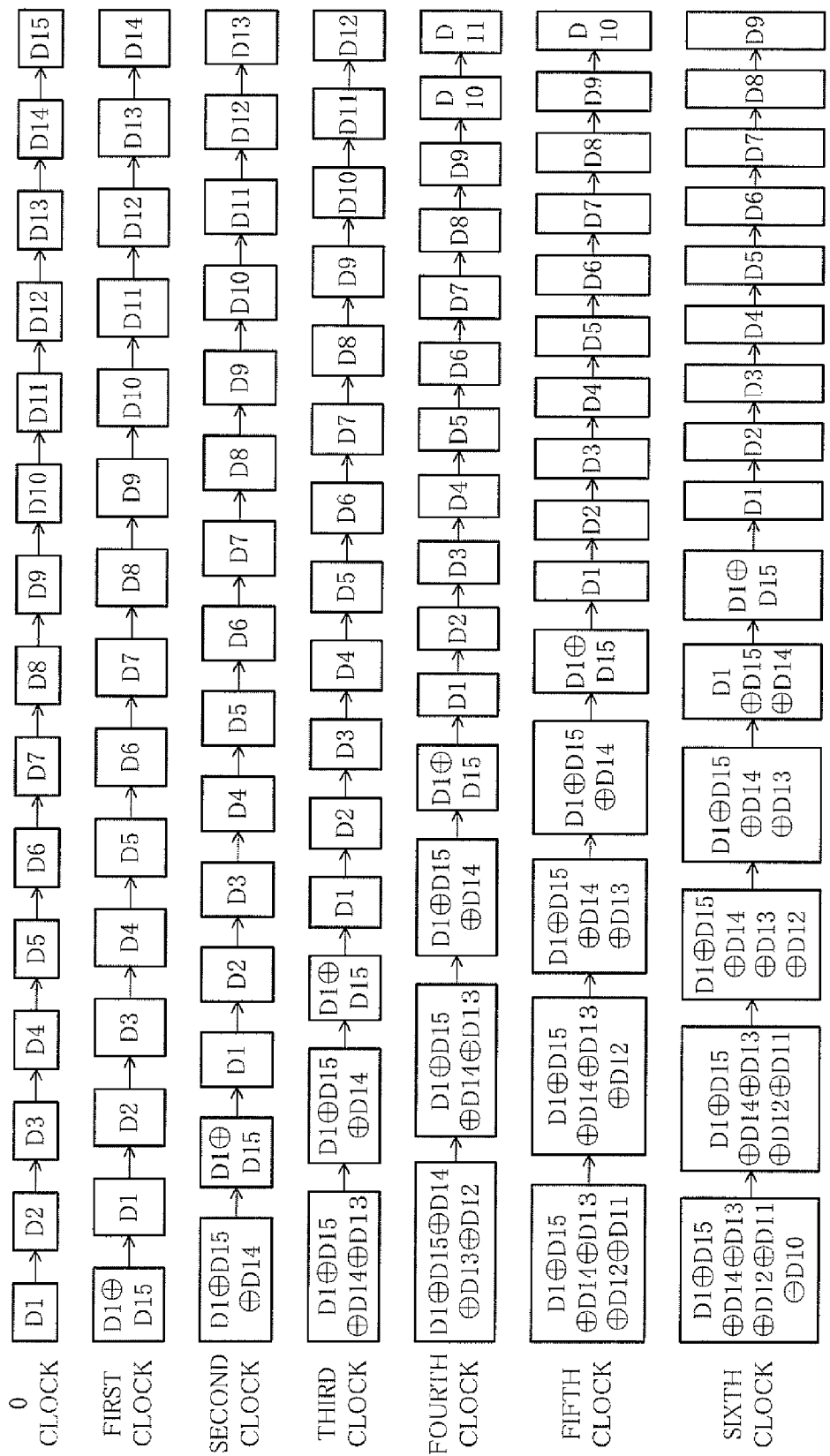

METHOD AND DEVICE FOR GENERATING PSEUDO-RANDOM BINARY DATA

CROSS-REFERENCE TO RELATED APPLICATIONS

This application is a continuing application, filed under 35 U.S.C. §111(a), of International Application PCT/JP2007/000542, filed on May 21, 2007, the entire contents of which are incorporated herein by reference.

FIELD

The embodiments discussed herein are related to a method and a device for generating k-bit parallel pseudo-random data by using "n" registers and "k" exclusive-OR gates.

BACKGROUND

With the spread of mobile communication through mobile phones, services have recently been provided based on a wireless communication system with high-speed capability, e.g., W-CDMA or CDMA-2000 technology. Direct sequence spread spectrum is used in such a mobile communication system to improve a communication rate and a call quality. A pseudo noise (PN) code, which is pseudo-random binary data, is used as a spreading code for the direct sequence spread spectrum. A PN code generator having a small circuit scale and high-speed capability is desired.

FIG. 14 is a circuit diagram illustrating a conventional PN code generator 80, and FIG. 15 is a diagram depicting an operation of the conventional PN code generator 80.

As illustrated in FIG. 14, the conventional PN code generator 80 is configured of a shift register consisting of fifteen registers FF1 through FF15 connected in series, and a single exclusive-OR gate XR. A feedback output of the last stage register FF15 is input through the exclusive-OR gate XR to the first stage register FF1. An output of the first stage register FF1 is input to the exclusive-OR gate XR.

Referring to FIG. 15, suppose that the initial contents of the individual registers FF1 through FF15 are D1 through D15, respectively. If a clock pulse is applied to each of the registers FF1 through FF15, the contents thereof are shifted by one bit into the next register FF and, further, the contents of the first stage register FF1 becomes contents obtained as a result of the exclusive-OR operation of the contents of the first stage register FF1 itself and the contents of the last stage register FF15. This is performed in response to the application of each clock pulse.

There is proposed a circuit for generating parallel pseudo-random data (Japanese Laid-open Patent Publication Nos. 9-321585 and 2002-342072).

In the case of the PN code generator 80 as illustrated in FIG. 14, one-bit data is produced every clock cycle. Accordingly, time corresponding to two clock cycles is necessary to produce two-bit data, and likewise, time corresponding to "n" clock cycles is necessary to produce n-bit data.

In order to produce n-bit data, e.g., 8-bit data, at high speed, it is necessary to appropriately increase the clock rate, which unfortunately makes the circuit configuration complicated.

The devices disclosed in Japanese Laid-open Patent Publication Nos. 9-321585 and 2002-342072 are capable of outputting multi-bit data in parallel; however the circuit configuration thereof is complex.

SUMMARY

A device for generating k-bit parallel pseudo-random data according to an aspect of the invention includes "n" registers including a first register through an n-th register, where "n" is an integer equal to or greater than 3, and "k" exclusive-OR gates including a first exclusive-OR gate through a k-th exclusive-OR gate, where "k" is an integer equal to or greater than 2, wherein an output of an m-th register is input to an (m+k)th register, where "m" is an integer between 1 and (n−k), outputs of the first exclusive-OR gate through a (k−1)th exclusive-OR gate are input to a second exclusive-OR gate through the k-th exclusive-OR gate, respectively, an output of the first register is input to the first exclusive-OR gate, the outputs of the first exclusive-OR gate through the k-th exclusive-OR gate are input to a k-th register through the first register, respectively, and outputs of "k" registers including an (n−k+1)th register through the n-th register are input to the k-th exclusive-OR gate through the first exclusive-OR gate, respectively, and the outputs of the "k" registers are also extracted as the k-bit parallel pseudo-random data.

The "k" exclusive-OR gates are used to individually send bit data to the "k" registers. The "k" pieces of bit data are shifted into the "k" registers upon the application of each clock pulse, and are output, as k-bit parallel pseudo-random data, from the "k" registers including a register arranged in the last stage and registers adjacent to the last stage register.

The registers are typically arranged in fifteen stages; however may be arranged in sixteen or more stages, or, alternatively, in fourteen or less stages.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram depicting an operation of a conventional PN code generator.

DESCRIPTION OF EMBODIMENT(S)

Hereinafter, a description is given of preferred embodiments of a multi-bit parallel configuration in a pseudo-random data generator 3 according to an embodiment of the present invention.

[2-Bit Parallel Configuration]

Figure 1:
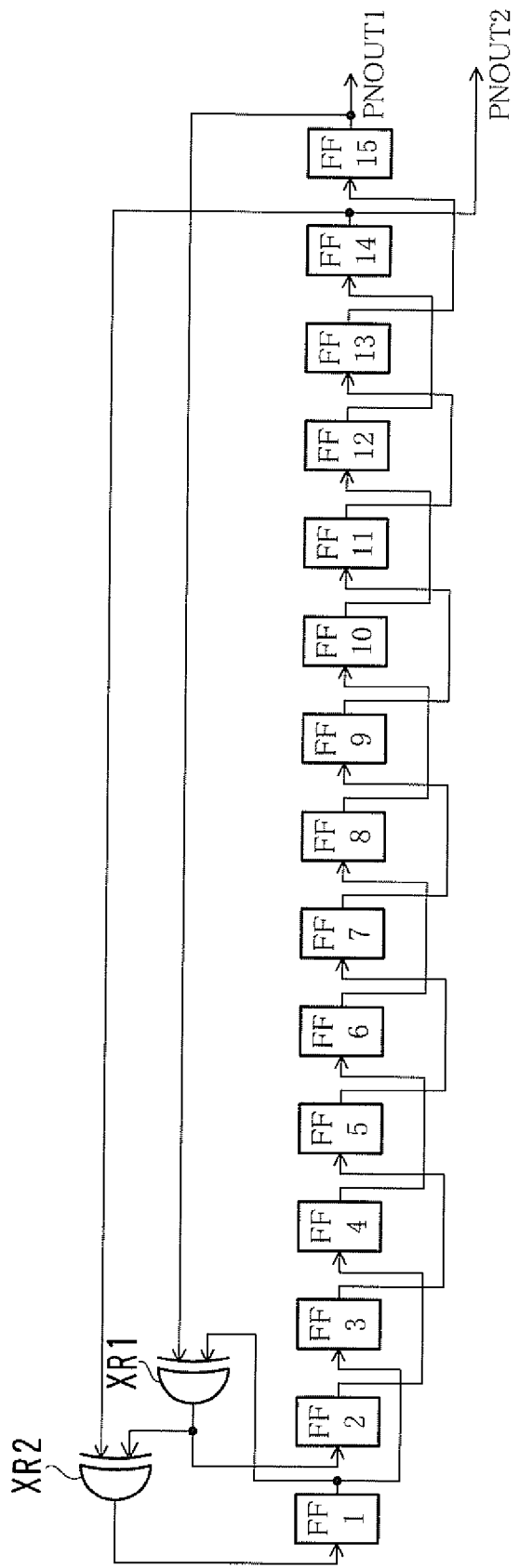
FIG. 1 is a circuit diagram of a pseudo-random data generator according to an embodiment of the present invention.
Figure 2:
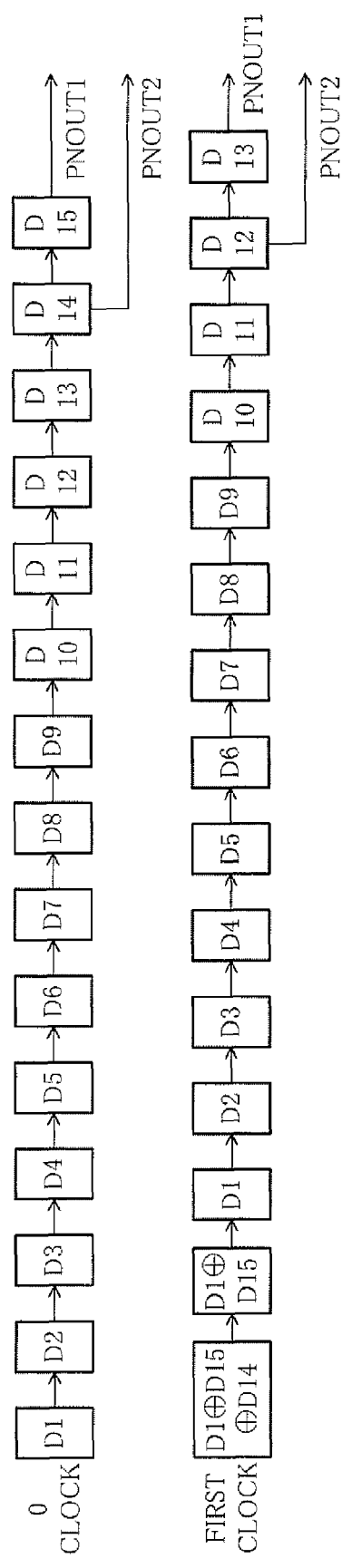
FIG. 2 is a diagram depicting an operation of a pseudo-random data generator.

FIG. 1 is a circuit diagram of the pseudo-random data generator 3 according to an embodiment of the present invention, and FIG. 2 is a diagram depicting an operation of the pseudo-random data generator 3.

Referring to FIG. 1, the pseudo-random data generator 3 is configured of fifteen registers FF1 through FF15, and two exclusive-OR gates XR1 and XR2.

The fifteen registers FF1 through FF15 are connected such that an output of each of the registers FF is input to the second next register FF. For example, an output of the first register FF1 is connected to an input of a third register FF3, an output of a second register FF2 is connected to an input of a fourth register FF4, and an output of a third register FF3 is connected to an input of a fifth register FF5.

A feedback output of the fifteenth (the last stage) register FF15 is fed through the first exclusive-OR gate XR1 to the second exclusive-OR gate XR2. An output of the second exclusive-OR gate XR2 is input to the first (the first stage) register FF1. An output of a fourteenth register FF14 is input to the second exclusive-OR gate XR2. The output of the first register FF1 is input to the first exclusive-OR gate XR1. An output of the first exclusive-OR gate XR1 is input to the second register FF2.

Each of the registers FF1 through FF15 is implemented by, for example, a flip-flop. Every time a clock signal CLK (not illustrated) is inputted to each of the registers FF1 through FF15, the contents of the registers FF1 through FF15 change depending on the input thereto.

The outputs of the fifteenth register FF15 and the fourteenth register FF14 are denoted by PNOUT1 and PNOUT2, respectively. The outputs PNOUT1 and PNOUT2 are 2-bit parallel pseudo-random binary data.

As illustrated in FIG. 2, suppose that the initial contents of the registers FF1 through FF15 are D1 through D15, respectively. If a clock pulse is applied to each of the registers FF1 through FF15, the contents thereof are shifted to the right by 2 bits. Specifically, the contents of the second register FF2 becomes D1⊕D15, which is the result of the exclusive-OR operation of the contents of the first register FF1 and the contents of the fifteenth register FF15. The contents of the first register FF1 becomes D1⊕D15⊕D14, which is the result of the exclusive-OR operation of the output of the first exclusive-OR gate XR1 and the contents of the fourteenth register FF14. This is performed in response to the application of each clock pulse.

As a result, 2-bit parallel pseudo-random data is output, as PNOUT1, from the fifteenth register FF15, and likewise it is output, as PNOUT2, from the fourteenth register FF14.

[3-Bit Parallel Configuration]

Figure 3:
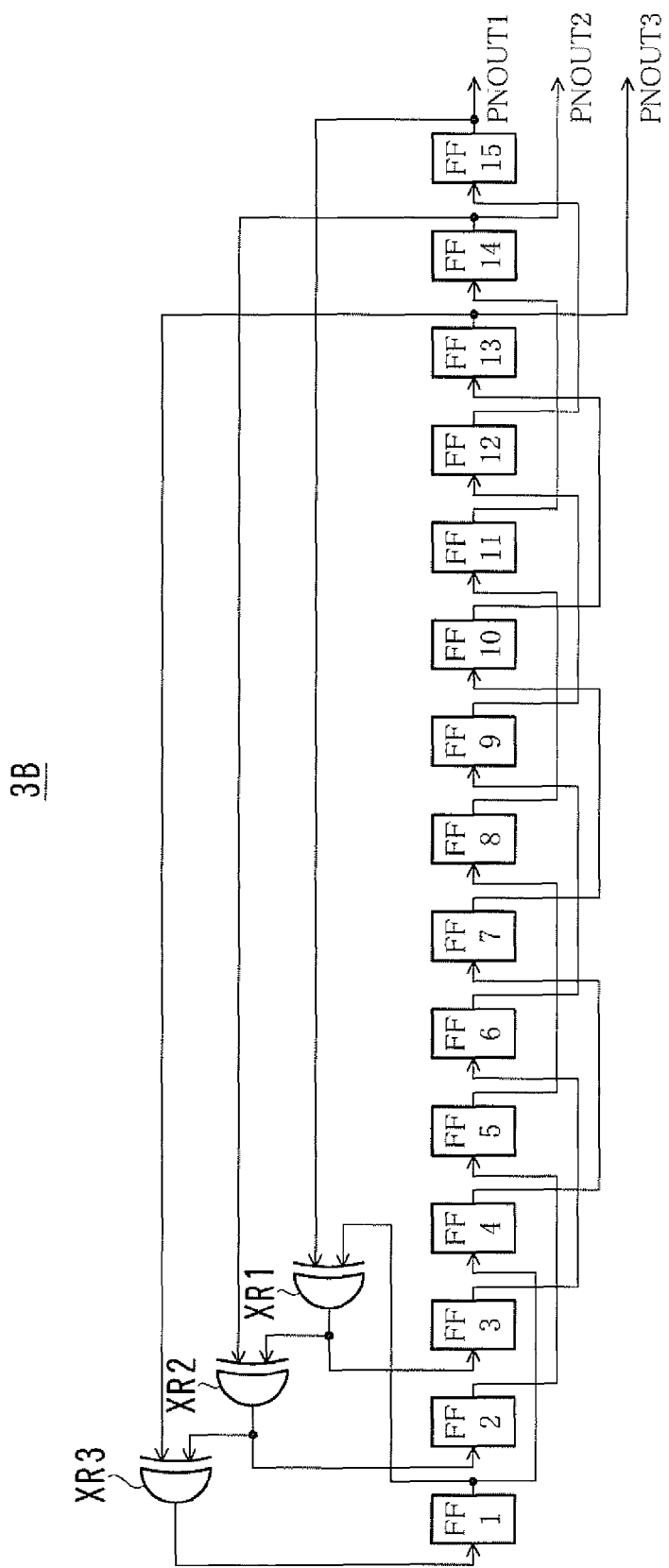
FIG. 3 is a circuit diagram of a pseudo-random data generator according to an embodiment of the present invention.
Figure 4:
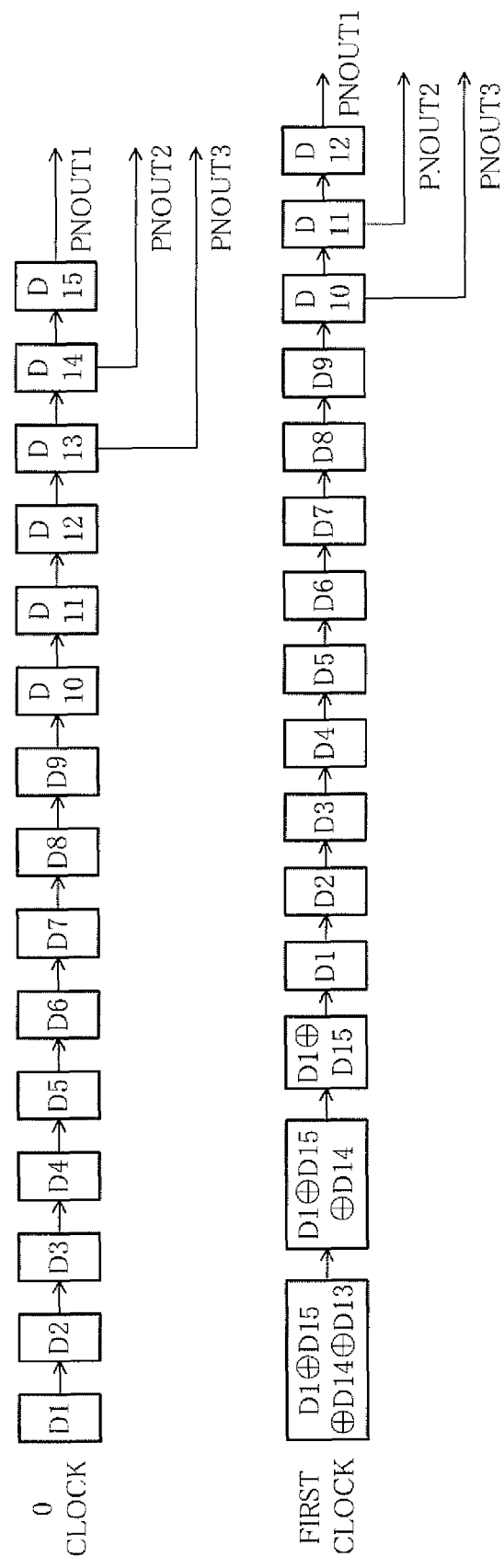
FIG. 4 is a diagram depicting an operation of a pseudo-random data generator.
Figure 5:
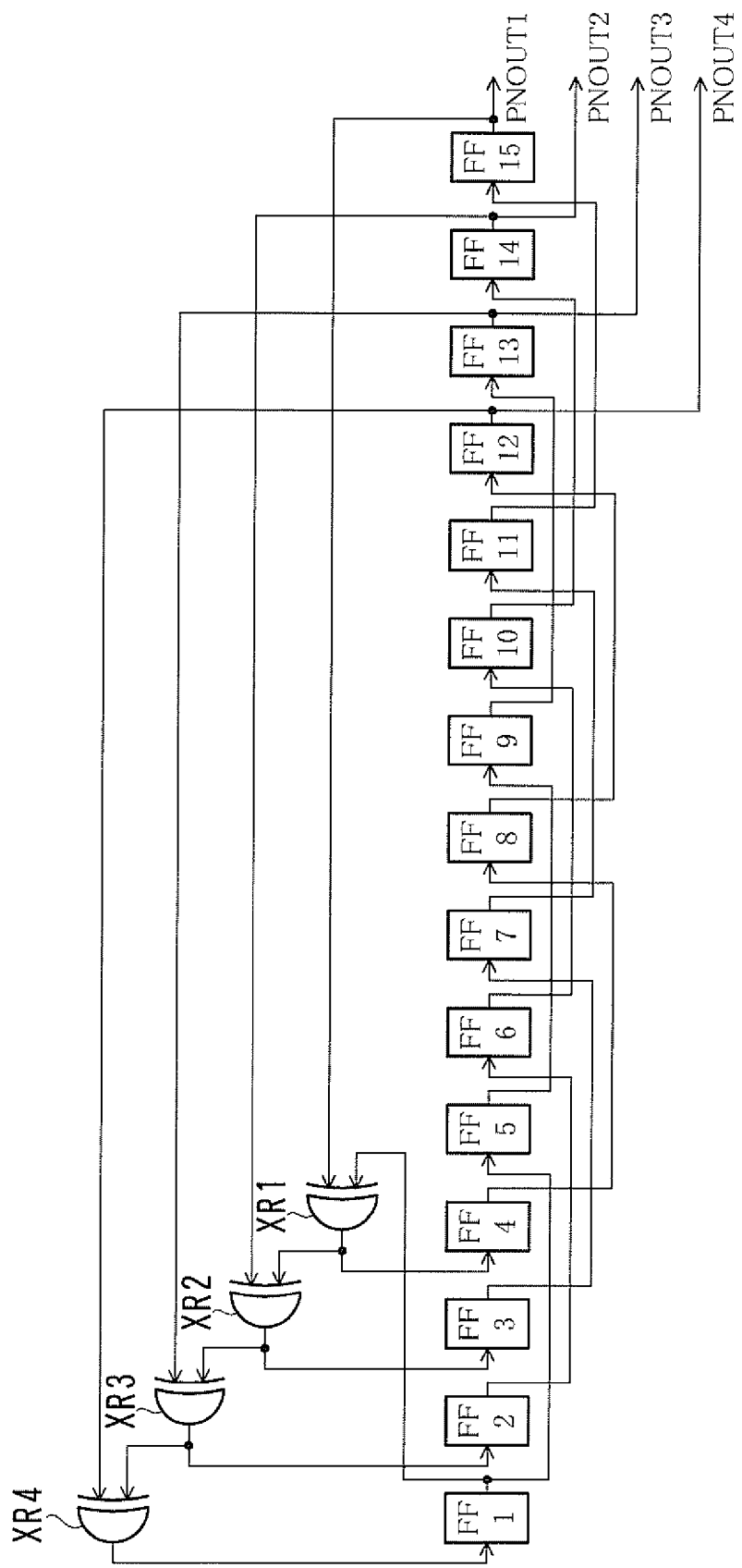
FIG. 5 is a circuit diagram of a pseudo-random data generator according to an embodiment of the present invention.
Figure 6:
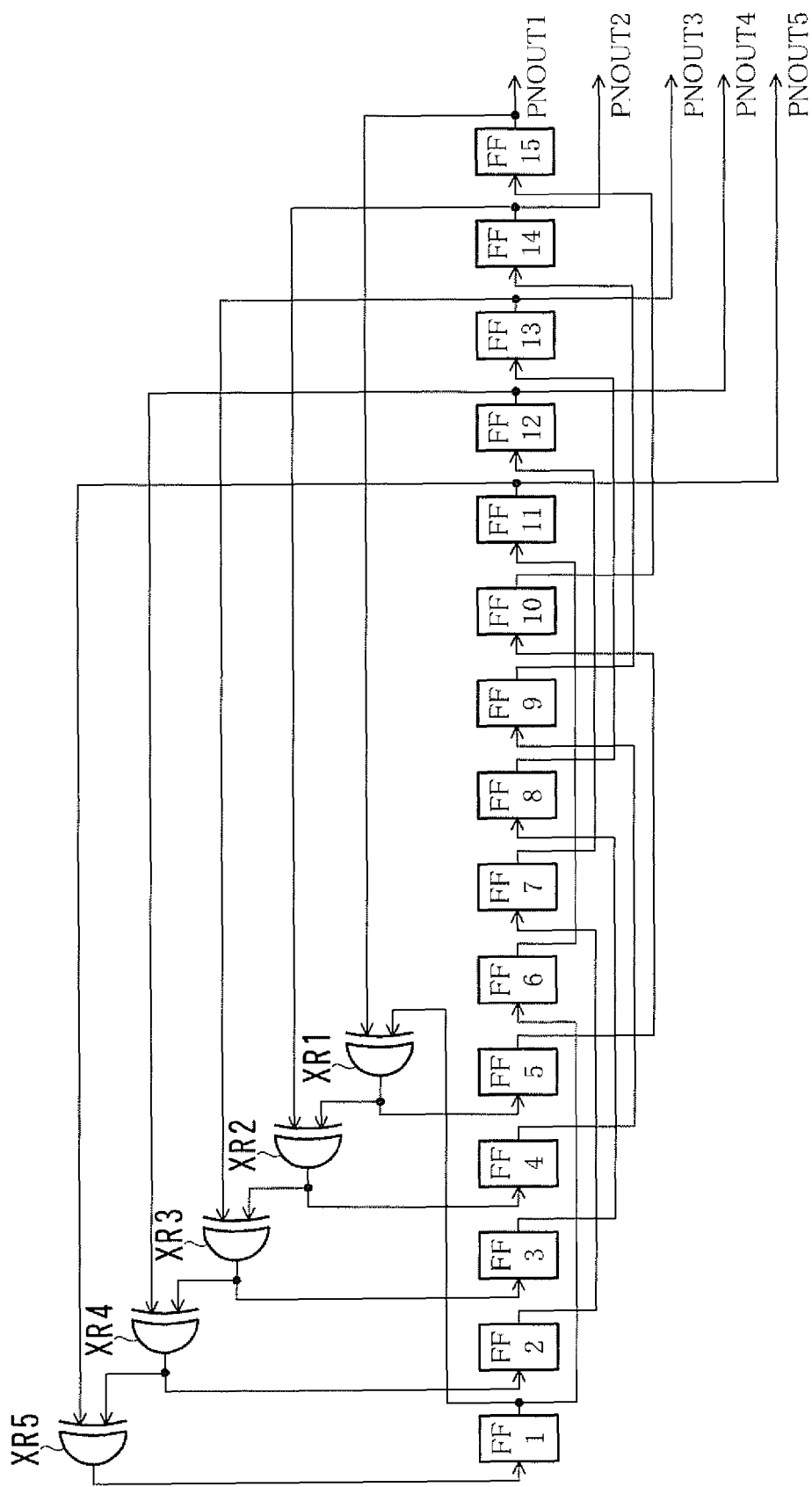
FIG. 6 is a circuit diagram of a pseudo-random data generator according to an embodiment of the present invention.
Figure 7:
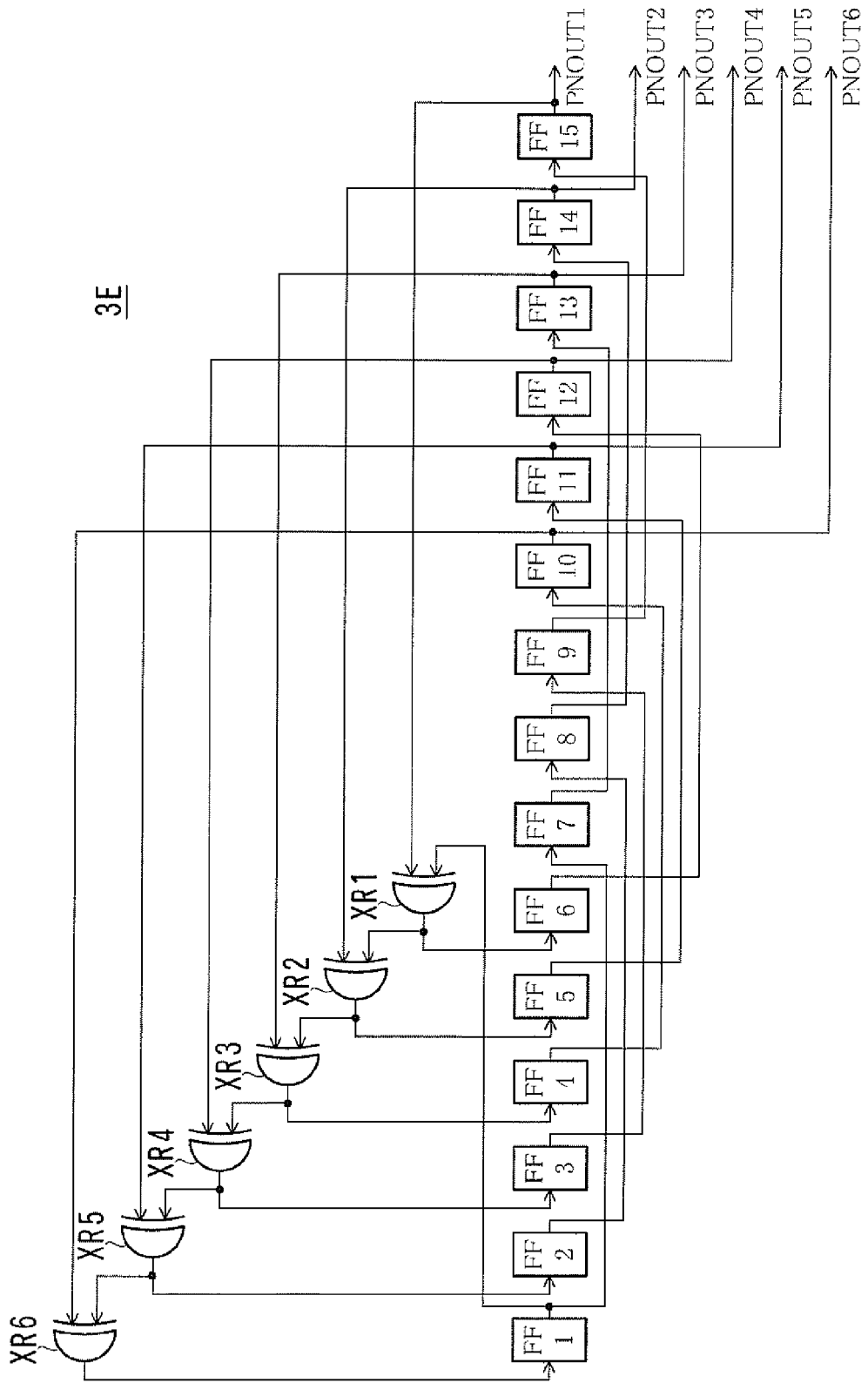
FIG. 7 is a circuit diagram of a pseudo-random data generator according to an embodiment of the present invention.
Figure 8:
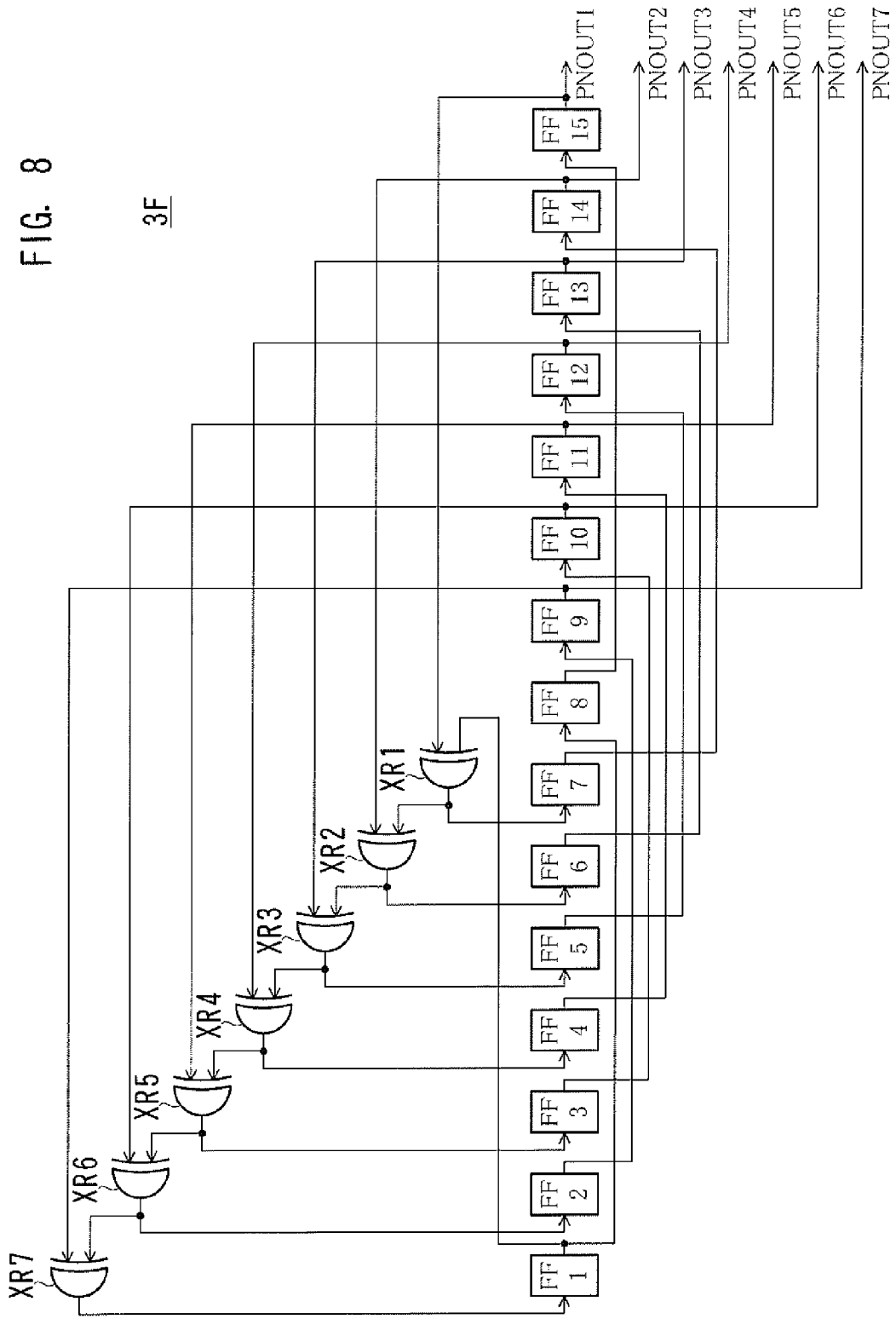
FIG. 8 is a circuit diagram of a pseudo-random data generator according to an embodiment of the present invention.
Figure 9:
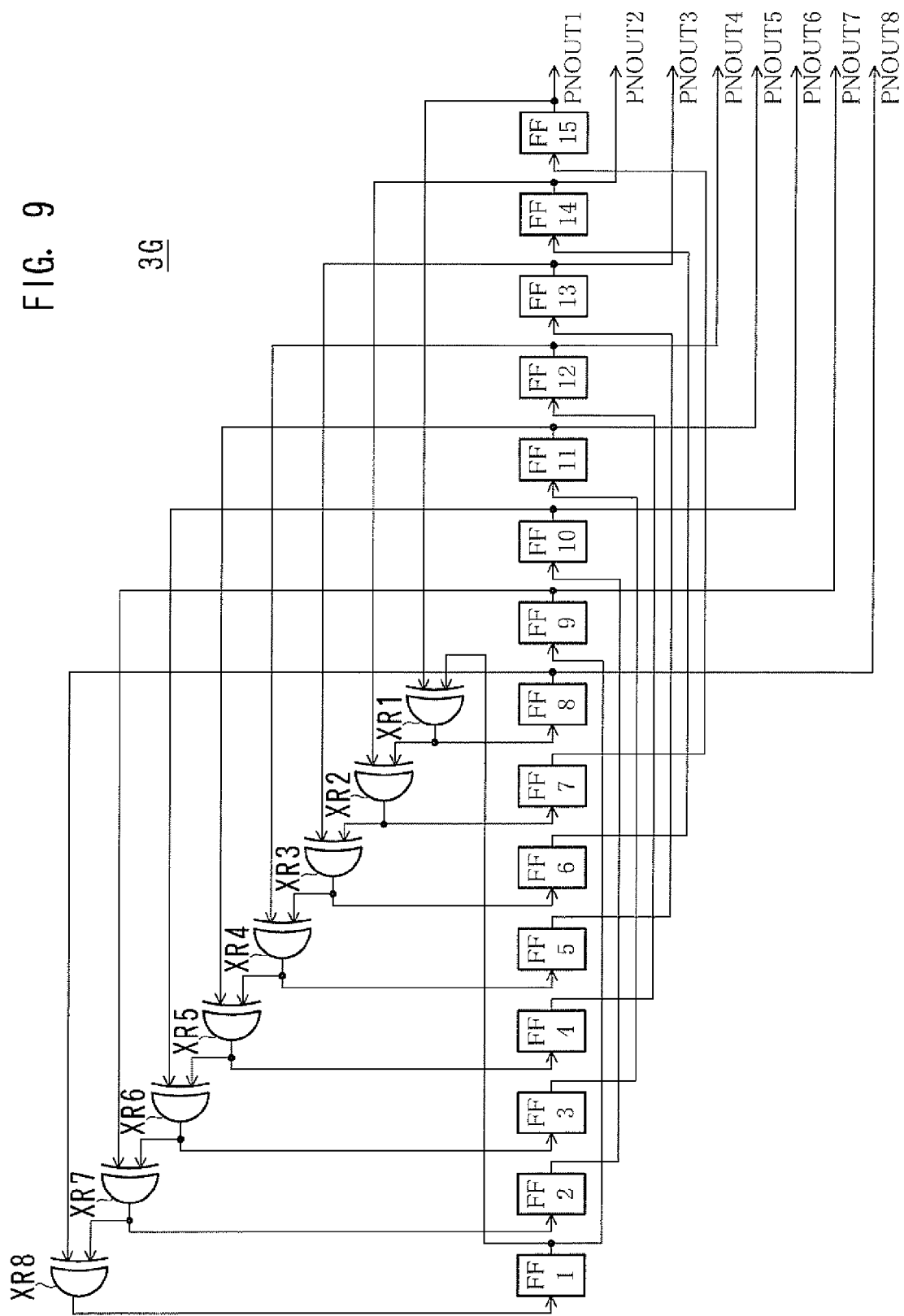
FIG. 9 is a circuit diagram of a pseudo-random data generator according to an embodiment of the present invention.
Figure 10:
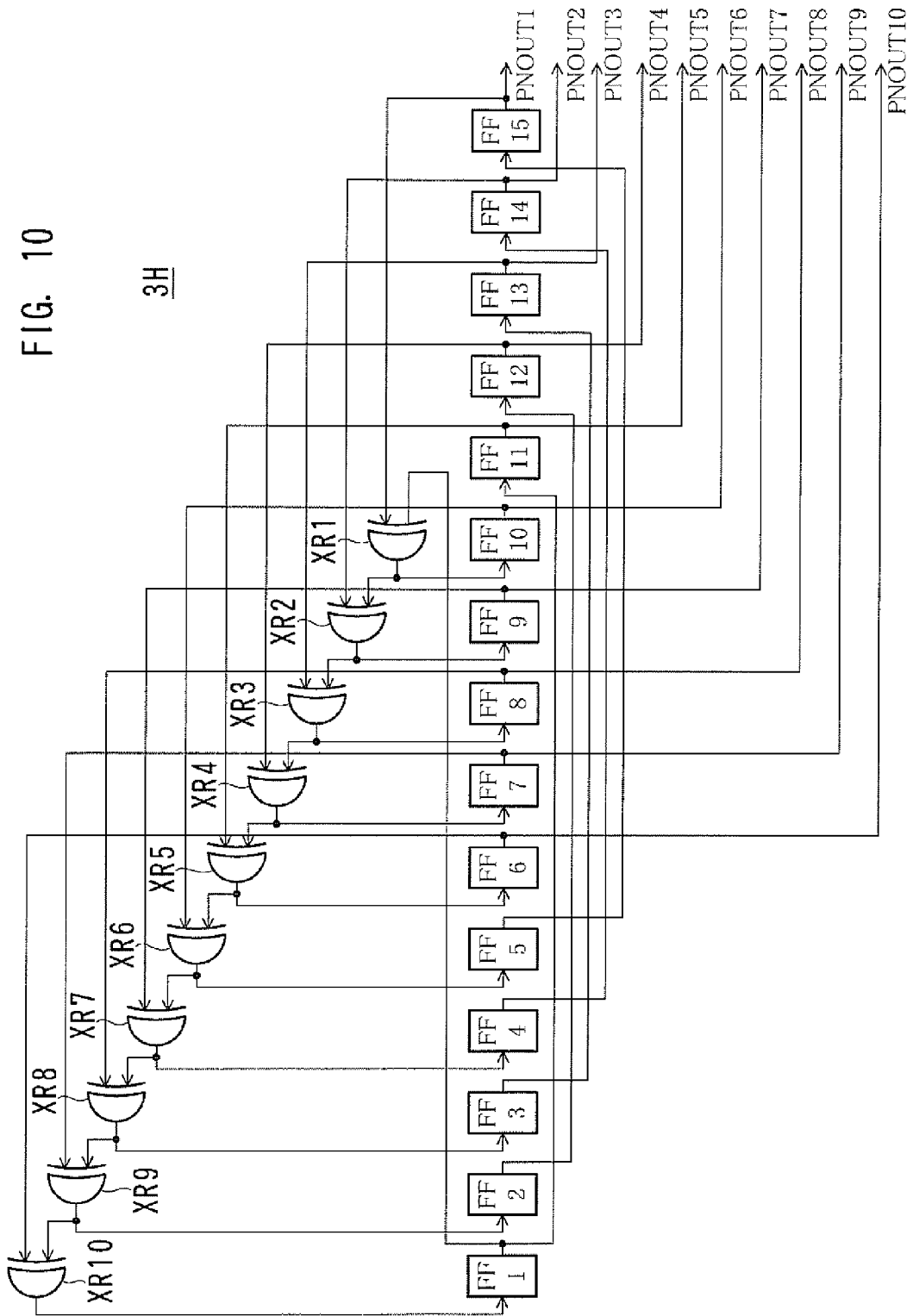
FIG. 10 is a circuit diagram of a pseudo-random data generator according to an embodiment of the present invention.

FIG. 3 is a circuit diagram of a pseudo-random data generator 3B according to another embodiment of the present invention, and FIG. 4 is a diagram depicting an operation of the pseudo-random data generator 3B. Description of the configuration and operation of the pseudo-random data generator 3B common to those in FIGS. 1 and 2 shall be omitted or simplified herein. The same applies to the cases described below.

Referring to FIG. 3, the pseudo-random data generator 3B is configured of fifteen registers FF1 through FF15, and three exclusive-OR gates XR1 through XR3.

The fifteen registers FF1 through FF15 are connected such that an output of each of the registers FF is input to the third next register FF. For example, an output of the first register FF1 is connected to an input of a fourth register FF4, an output of a second register FF2 is connected to an input of a fifth register FF5, and an output of a third register FF3 is connected to an input of a sixth register FF6.

A feedback output of the fifteenth register FF15 is fed through the first and second exclusive-OR gates XR1 and XR2 to the third exclusive-OR gate XR3. An output of the third exclusive-OR gate XR3 is input to the first register FF1.

An output of a fourteenth register FF14 is input to the second exclusive-OR gate XR2. An output of a thirteenth register FF13 is input to the third exclusive-OR gate XR3. The output of the first register FF1 is input to the first exclusive-OR gate XR1. The outputs of the first and second exclusive-OR gates XR1 and XR2 are respectively input to the third and second registers FF3 and FF2.

The outputs of the fifteenth register FF15, the fourteenth register FF14, and the thirteenth register FF13 are denoted by PNOUT1, PNOUT2, and PNOUT3, respectively. The outputs PNOUT1, PNOUT2, and PNOUT3 are 3-bit parallel pseudo-random binary data.

As illustrated in FIG. 4, if a clock pulse is applied to each of the registers FF1 through FF15, the initial contents of the registers FF1 through FF15 are shifted to the right by 3 bits. Specifically, the contents of the third register FF3 becomes D1⊕D15. The contents of the second register FF2 becomes D1⊕D15⊕D14. The contents of the first register FF1 becomes D1⊕D15⊕D14⊕D13. This is performed in response to the application of each clock pulse.

As a result, 3-bit parallel pseudo-random binary data is output, as PNOUT1, PNOUT2, and PNOUT3, from the fifteenth register FF15, the fourteenth register FF14, and the thirteenth register FF13, respectively.

[4-Bit Parallel Configuration through 10-Bit Parallel Configuration]

FIGS. 5 through 10 are circuit diagrams of pseudo-random data generators 3C through 3H according to yet other embodiments of the present invention.

Referring to FIGS. 5 through 10, the pseudo-random data generators 3C through 3H are devices, respectively, for generating 4-bit parallel pseudo-random binary data, 5-bit parallel pseudo-random binary data, 6-bit parallel pseudo-random binary data, 7-bit parallel pseudo-random binary data, 8-bit parallel pseudo-random binary data, and 10-bit parallel pseudo-random binary data. Each of the pseudo-random data generators 3C through 3H is configured of fifteen registers FF1 through FF15 and "k" exclusive-OR gates XR, where "k" is equal to the number of parallel bits of each of the pseudo-random data generators 3C through 3H.

In each of the pseudo-random data generators 3C through 3H, the fifteen registers FF1 through FF15 and the "k" exclusive-OR gates XR are connected in the following manner. An output of each of the "n" registers bypasses (k−1) registers and is input to one of the "n" registers that is arranged immediately after the (k−1) registers thus bypassed. Feedback outputs of "k" registers sequentially starting from the n-th register are respectively input to the first exclusive-OR gate through the k-th exclusive-OR gate. Outputs of the "k" exclusive-OR gates sequentially starting from the first exclusive-OR gate are respectively input to the second exclusive-OR gate through the k-th exclusive-OR gate, and are also respectively input to "k" registers sequentially starting from the register farthest from the first register through the first register. Outputs of the "k" registers sequentially starting from the n-th register are extracted as the k-bit parallel pseudo-random data.

Stated differently, referring to FIGS. 5 through 10, in each case, the fifteen registers FF1 through FF15 are connected such that an output of each of the registers FF is not input to registers FF to be bypassed, and is input to the register FF immediately after the registers FF to be bypassed. The number of registers FF to be bypassed is equal to the number obtained by subtracting one from the number of parallel bits.

Feedback outputs of the fifteenth register FF15, the fourteenth register FF14, the thirteenth register FF13, and so on are respectively input to the first exclusive-OR gate XR1, the second exclusive-OR gate XR2, the third exclusive-OR gate XR3, and so on.

The outputs of the first exclusive-OR gate XR1, the second exclusive-OR gate XR2, the third exclusive-OR gate XR3, and so on are input to the respective next exclusive-OR gates XR2, XR3, and so on. The outputs of the first exclusive-OR gate XR1, the second exclusive-OR gate XR2, the third exclusive-OR gate XR3, and so on are also input to a k-th register FF through the first register FF1, respectively.

The outputs of the fifteenth register FF15, the fourteenth register FF14, the thirteenth register FF13, and so on are respectively denoted by PNOUT1, PNOUT2, PNOUT3, and so on. The outputs PNOUT1, PNOUT2, PNOUT3, and so on are k-bit parallel pseudo-random binary data.

If a clock pulse is applied to each of the registers FF1 through FF15, the initial contents of the registers FF1 through FF15 are shifted to the right by "k" bits. This is performed in response to the application of each clock pulse.

As a result, k-bit parallel pseudo-random binary data is output, as PNOUT1, PNOUT2, PNOUT3, and so on, from the fifteenth register FF15, the fourteenth register FF14, the thirteenth register FF13, and so on, respectively.

[K-Bit Parallel Configuration]

Figure 11:
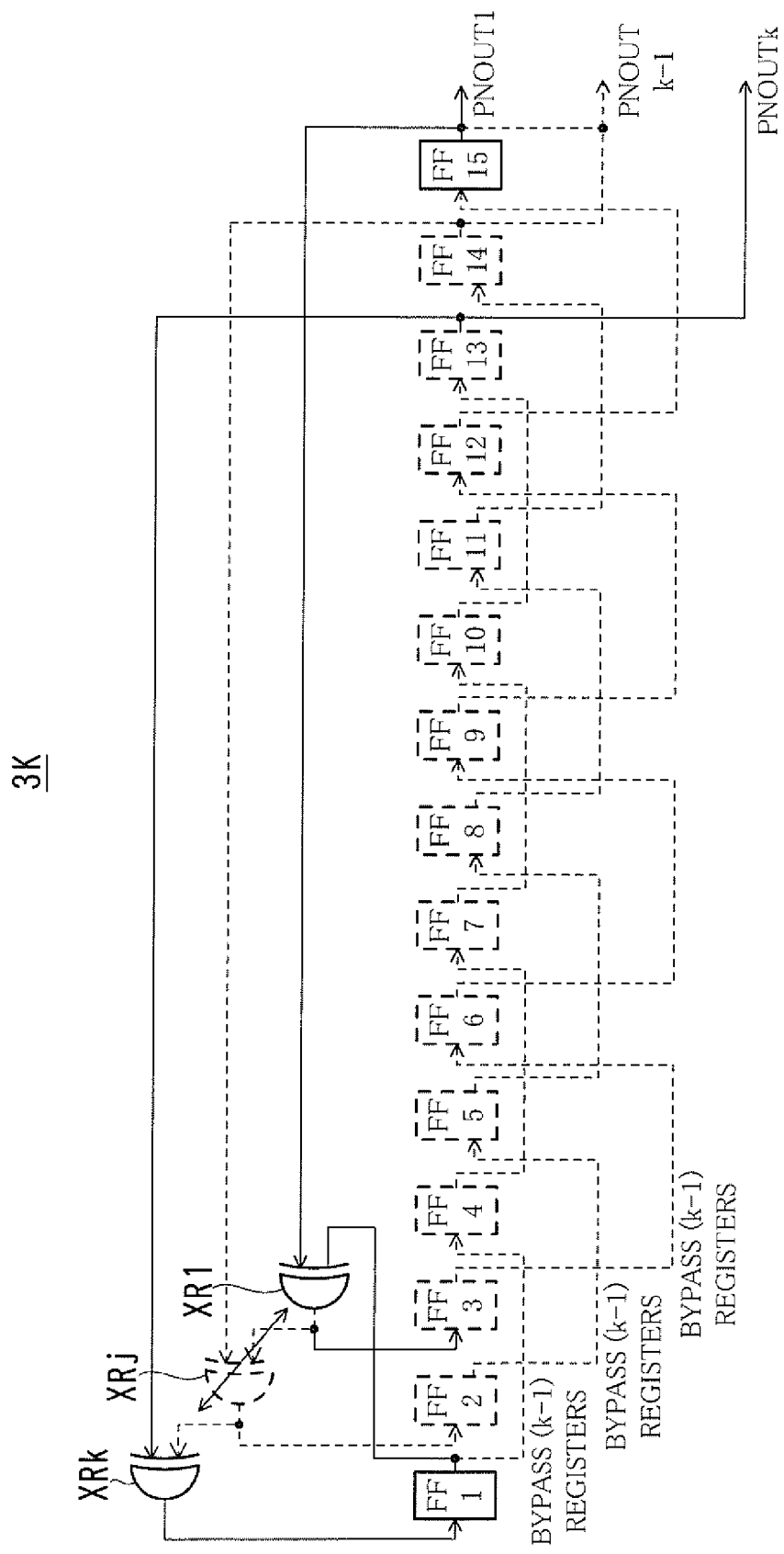
FIG. 11 is a circuit diagram of a k-bit parallel pseudo-random binary data generator.

FIG. 11 is a circuit diagram of a k-bit parallel pseudo-random binary data generator 3K.

Referring to FIG. 11, k-bit parallel pseudo-random binary data is generated by using fifteen registers, from the first register FF1 through an n-th register FF15 (where "n" is 15 herein), and "k" exclusive-OR gates, from the first exclusive-OR gate XR to a k-th exclusive-OR gate XR (where "k" is an integer equal to or greater than 2).

An output of an m-th register FF is input to an (m+k)th register FF, where "m" is an integer between 1 and (n−k). Outputs of the first exclusive-OR gate XR through an (k−1)th exclusive-OR gate XR are respectively input to the second exclusive-OR gate XR through the k-th exclusive-OR gate XR. An output of the first register FF is input to the first exclusive-OR gate XR. The outputs of the first exclusive-OR gate XR through the k-th exclusive-OR gate XR are respectively input to the k-th register FF through the first register FF.

Outputs of "k" registers, from an (n−k+1)th register FF through the n-th register FF, are respectively input to the k-th exclusive-OR gate XR through the first exclusive-OR gate XR, and are also extracted, as k-bit parallel pseudo-random binary data, at the outputs PNOUT1, PNOUT2, PNOUT3, . . . PNOUTk.

The k-bit parallel pseudo-random binary data generator 3K illustrated in FIG. 11 may be described as follows.

The output of the m-th register FF is input to the (m+k)th register FF, where "m" is an integer between 1 and (n−k). The input to the first exclusive-OR gate XR is connected to receive the outputs of the first register FF and the n-th register FF. The output of the first exclusive-OR gate XR is input to the second exclusive-OR gate XR and the k-th register FF. An input to a j-th exclusive-OR gate XR is connected to receive outputs of a (j−1)th exclusive-OR gate XR and an (n−j+1)th register FF, where "j" is an integer between 2 and (k−1). The output of the j-th exclusive-OR gate XR is input to the (j+1)th exclusive-OR gate XR and a (k−j+1)th register FF. An input to the k-th exclusive-OR gate XR is connected to receive the outputs of the (k−1)th exclusive-OR gate XR and the (n−k+1)th register FF. The output of the k-th exclusive-OR gate XR is input to the first register FF1. The outputs of the "k" registers, from the (n−k+1)th register FF through the n-th register FF, are extracted as k-bit parallel pseudo-random binary data.

As discussed above, the various types of the pseudo-random data generators 3, 3B, 3C, 3D, 3E, 3F, 3G, 3H, and 3K are configured to easily generate multi-bit parallel pseudo-random binary data. The individual generators have a simple structure, and, the circuit scale thereof may be reduced.

Each of the pseudo-random data generators 3, 3B, 3C, 3D, 3E, 3F, 3G, 3H, and 3K may be used as a multi-bit parallel PN code generator with high-speed capability.

In the embodiments discussed above, the registers FF are arranged in fifteen stages. Instead, however, the registers FF may be arranged in sixteen or more stages, or, alternatively, in fourteen or less stages. The use of the registers FF arranged in sixteen or more stages makes it possible to generate 11-bit or more parallel pseudo-random binary data.

The following is a description of an example of the structure of a base station including the pseudo-random data generator 3. Note that a mobile base station 1 described below is a simulated mobile base station; however, the mobile base station 1 may be used to implement a high-speed wireless transmission line test.

Figure 12:
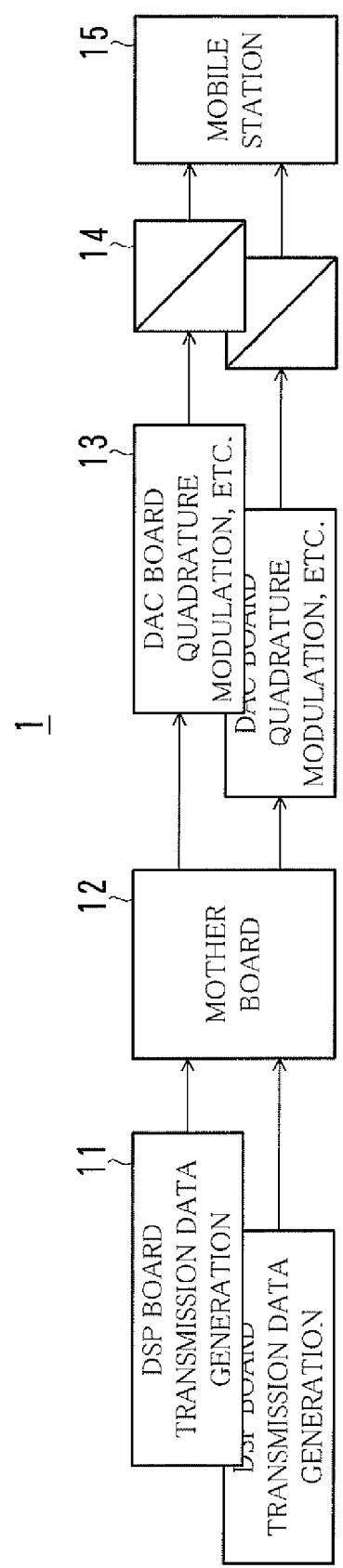
FIG. 12 is a block diagram illustrating an example of a simulated mobile base station.
Figure 13:
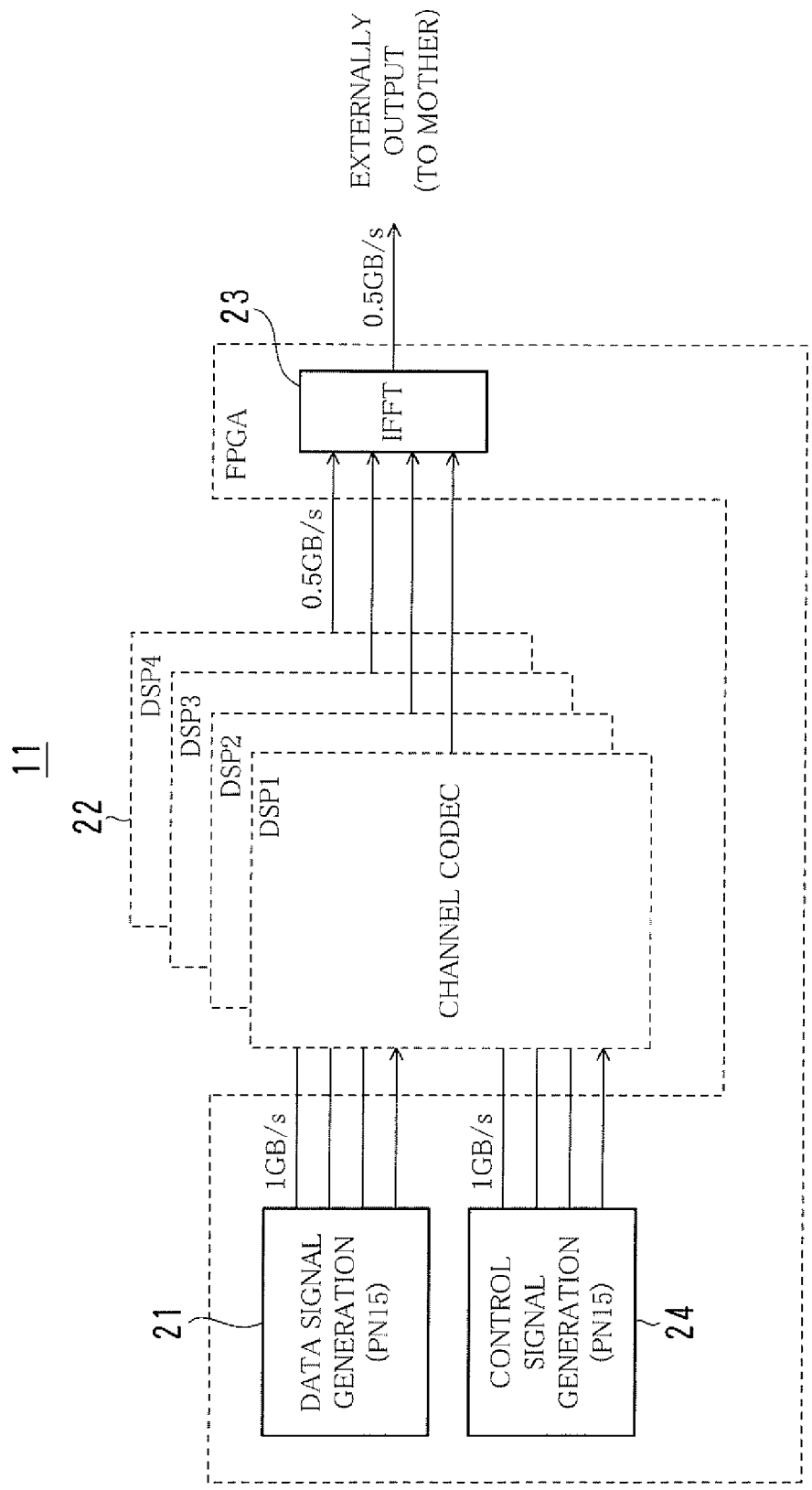
FIG. 13 is a block diagram illustrating an example of a configuration of a transmission data generating portion of a digital signal processor (DSP) board.
Figure 14:
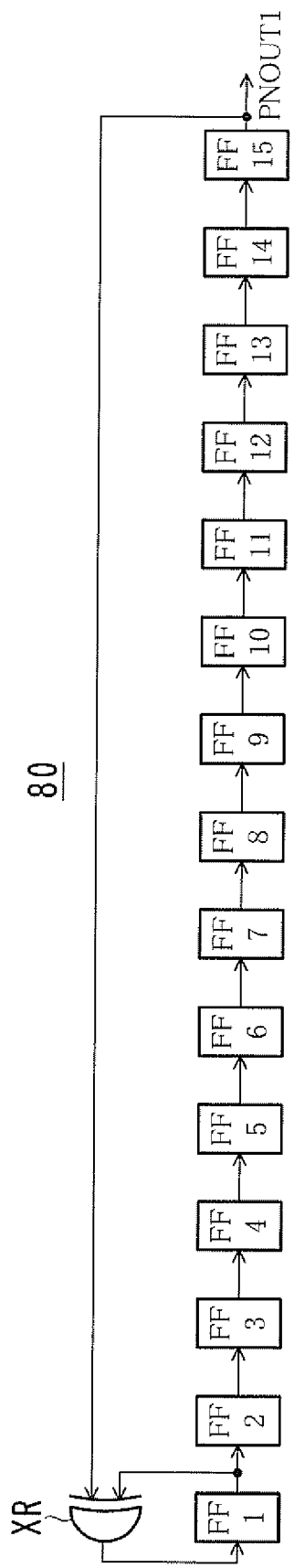
FIG. 14 is a circuit diagram of a conventional PN code generator.

FIG. 12 is a block diagram illustrating an example of the simulated mobile base station 1, and FIG. 13 is a block diagram illustrating an example of the configuration of a transmission data generating portion of a digital signal processor (DSP) board 11 of the mobile base station 1 illustrated in FIG. 12.

Referring to FIG. 12, the mobile base station 1 includes the DSP board 11, a mother board 12, a Digital to Analog Converter (DAC) board 13, an RF module 14 for, for example, frequency conversion, and a mobile station 15. The configuration itself of the mobile base station 1 is well known; therefore the description thereof is omitted herein.

Referring to FIG. 13, the DSP board 11 includes a data signal generating portion 21, a channel CODEC portion 22, an IFFT (inverse Fast Fourier transform) portion 23, and a control signal generating portion 24. In the illustrated example, the data signal generating portion 21, the control signal generating portion 24, and the IFFT portion 23 are implemented by a Field Programmable Gate Array (FPGA), and the channel CODEC portion 22 is implemented by a DSP.

The data signal generating portion 21 includes the pseudo-random data generator 3, 3B, 3C, 3D, 3E, 3F, 3G, 3H, or 3K, and generates data signals at high-speed. The data signals are transmitted, by using a high-speed data communication function, i.e., a Double Data Rate (DDR) function, to the channel CODEC portion 22 implemented by a DSP. The DSP functioning as the channel CODEC portion 22 performs channel coding/decoding on the data signals, and then, transmits the data signals to the FPGA. The IFFT portion 23 performs inverse fast Fourier transform on the data signals, and after that, externally outputs the data signals to the mother board 12.

In the embodiments discussed above, it is possible to add a register FF, an exclusive-OR gate XR, or a variety of other circuits or elements to the pseudo-random data generator 3, 3B, 3C, 3D, 3E, 3F, 3G, 3H, or 3K. It is also possible to modify the circuits therein. The overall configuration of the pseudo-random data generator 3, 3B, 3C, 3D, 3E, 3F, 3G, 3H, or 3K, the configurations of various portions thereof, the structure, the shape, the size, and the quantity thereof, the circuit configuration, the type of the elements, and the like may be altered as required in accordance with the subject matter of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A method for generating k-bit parallel pseudo-random data by using "n" registers including a first register through an n-th register and "k" exclusive-OR gates including a first exclusive-OR gate through a k-th exclusive-OR gate, where "n" is an integer equal to or greater than 3 and "k" is an integer equal to or greater than 2, the method comprising:
    inputting an output of an m-th register to an (m+k)th register, where "m" is an integer between 1 and (n–k);
    inputting outputs of the first exclusive-OR gate through a (k−1)th exclusive-OR gate to a second exclusive-OR gate through the k-th exclusive-OR gate XR, respectively;
    inputting an output of the first register to the first exclusive-OR gate;
    inputting the outputs of the first exclusive-OR gate through the k-th exclusive-OR gate to a k-th register through the first register, respectively; and
    inputting outputs of "k" registers including an (n−k+1)th register through the n-th register to the k-th exclusive-OR gate through the first exclusive-OR gate, respectively, and also extracting the outputs of the "k" registers as the k-bit parallel pseudo-random data.

2. A device for generating k-bit parallel pseudo-random data, the device comprising:
    "n" registers including a first register through an n-th register, where "n" is an integer equal to or greater than 3; and
    "k" exclusive-OR gates including a first exclusive-OR gate through a k-th exclusive-OR gate, where "k" is an integer equal to or greater than 2,
    wherein the "n" registers are connected such that an output of each of the "n" registers bypasses (k−1) registers and is input to one of the "n" registers that is arranged immediately after the (k−1) registers thus bypassed,
    feedback outputs of "k" registers sequentially starting from the n-th register are respectively input to the first exclusive-OR gate through the k-th exclusive-OR gate,
    outputs of the "k" exclusive-OR gates sequentially starting from the first exclusive-OR gate are respectively input to next exclusive-OR gates, and are also respectively input to "k" registers sequentially starting from the register farthest from the first register, and
    outputs of the "k" registers sequentially starting from the n-th register are extracted as the k-bit parallel pseudo-random data.

3. A device for generating k-bit parallel pseudo-random data, the device comprising:
    "n" registers including a first register through an n-th register, where "n" is an integer equal to or greater than 3; and
    "k" exclusive-OR gates including a first exclusive-OR gate through a k-th exclusive-OR gate, where "k" is an integer equal to or greater than 2,
    wherein an output of an m-th register is input to an (m+k)th register, where "m" is an integer between 1 and (n−k),
    outputs of the first exclusive-OR gate through a (k−1)th exclusive-OR gate are input to a second exclusive-OR gate through the k-th exclusive-OR gate, respectively,
    an output of the first register is input to the first exclusive-OR gate,
    the outputs of the first exclusive-OR gate through the k-th exclusive-OR gate are input to a k-th register through the first register, respectively, and
    outputs of "k" registers including an (n−k+1)th register through the n-th register are input to the k-th exclusive-OR gate through the first exclusive-OR gate, respectively, and the outputs of the "k" registers are also extracted as the k-bit parallel pseudo-random data.

\* \* \* \* \*